United States Patent
Tomar et al.

(10) Patent No.: US 11,652,636 B2
(45) Date of Patent: May 16, 2023

(54) SYSTEM AND METHOD FOR SECURING AND AUTHENTICATING SERIALIZED DATA ASSOCIATED WITH A PRODUCT

(71) Applicant: Cognizant Technology Solutions India Pvt. Ltd, Chennai (IN)

(72) Inventors: Nishkarsh Tomar, Bareilly (IN); Shubam Gupta, Jammu (IN); Pooja Gupta, Ludhiana (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 221 days.

(21) Appl. No.: 17/154,057

(22) Filed: Jan. 21, 2021

(65) Prior Publication Data

US 2022/0141022 A1 May 5, 2022

(30) Foreign Application Priority Data

Nov. 3, 2020 (IN) .............................. 202041047911

(51) Int. Cl.
*H04L 29/06* (2006.01)
*H04L 9/32* (2006.01)
(Continued)

(52) U.S. Cl.
CPC ........... *H04L 9/3226* (2013.01); *G06Q 50/28* (2013.01); *H04L 9/0866* (2013.01);
(Continued)

(58) Field of Classification Search
CPC ... H04L 9/3226; H04L 9/0866; H04L 9/3236; H04L 63/20; H04L 9/50; H04L 63/10; G06Q 50/28
See application file for complete search history.

(56) References Cited

U.S. PATENT DOCUMENTS 8,270,603 B1  9/2012 Durst
8,756,124 B1  6/2014 Sayers
(Continued)

FOREIGN PATENT DOCUMENTS

CN    107657438    * 2/2018

OTHER PUBLICATIONS

Chiacchio et al. "A decentralized application for the traceability process in the pharma industry", International Conference on Industry 4.0 and Smart Manufacturing (ISM 2019), Feb. 2020 (Year: 2020).*

(Continued)

*Primary Examiner* — Taghi T Arani
*Assistant Examiner* — Lin Chang
(74) *Attorney, Agent, or Firm* — Cantor Colburn LLP

(57) ABSTRACT

A system and a method for securing and authenticating serialized data associated with a product across a supply chain is disclosed. In operation, the present invention provides for generating a Hash ID by associating serialised data and serialisation ID of the product with a blockchain platform. Further, a set of authentication rules are generated for validating access to the serialised data based on the Hash ID. Furthermore, a plurality of identifier elements are generated for integration with one or more levels of product packaging. Yet further, access to the serialized data across the supply chain is authorized on determination of the authenticity of the supply chain participants based on the identifier elements using a decryption technique and the set of authentication rules. A result representative of authentication success or failure is stored in the blockchain platform.

21 Claims, 4 Drawing Sheets

(51) Int. Cl.
*H04L 9/08* (2006.01)
*G06Q 50/28* (2012.01)
*H04L 9/40* (2022.01)
*H04L 9/00* (2022.01)

(52) U.S. Cl.
CPC ............ *H04L 9/3236* (2013.01); *H04L 63/20* (2013.01); *H04L 9/50* (2022.05)

(56) References Cited

U.S. PATENT DOCUMENTS

| | | | | |
|---|---|---|---|---|
| 11,258,590 | B1* | 2/2022 | Tsarfati | ................ H04L 9/0825 |
| 2013/0246810 | A1 | 9/2013 | Orsini | |
| 2014/0337984 | A1* | 11/2014 | Simske | ................ G06F 21/60 726/26 |
| 2016/0330027 | A1 | 11/2016 | Ebrahimi | |
| 2017/0262862 | A1 | 9/2017 | Aljawhari | |
| 2018/0096175 | A1 | 4/2018 | Schmeling | |
| 2018/0108024 | A1* | 4/2018 | Greco | ................ H04W 4/029 |
| 2019/0340623 | A1* | 11/2019 | Rivkind | ................ H04L 9/50 |
| 2019/0367239 | A1* | 12/2019 | Camenisch | ............ B65D 79/02 |
| 2020/0034876 | A1* | 1/2020 | Soundararajan | ...... H04L 9/0637 |
| 2020/0235941 | A1* | 7/2020 | Nguyen | ................ G06Q 50/08 |
| 2021/0319895 | A1* | 10/2021 | Joao | ...................... G06F 16/182 |
| 2022/0066424 | A1* | 3/2022 | Jahunnathan | ...... G05B 19/4185 |

OTHER PUBLICATIONS

Mikko O. Lehtonen, "Trust and Security in RFID-Based Product Authentication Systems", IEEE Systems Journal, vol. 1, No. 2, Dec. 2007.

Blockchain in Pharma Supply Chain—Reducing Counterfeit Drugs, pp. 1-12, URL: https://www.leewayhertz.com/blockchain-in-pharma-supply-chain/, May 2020.

Yanling Chang, "Blockchain in global supply chains and cross border trade: a critical synthesis of the state-of-the-art, challenges and opportunities", International Journal of Production Research, vol. 58, Issue 7, Published online: Aug. 11, 2019.

* cited by examiner

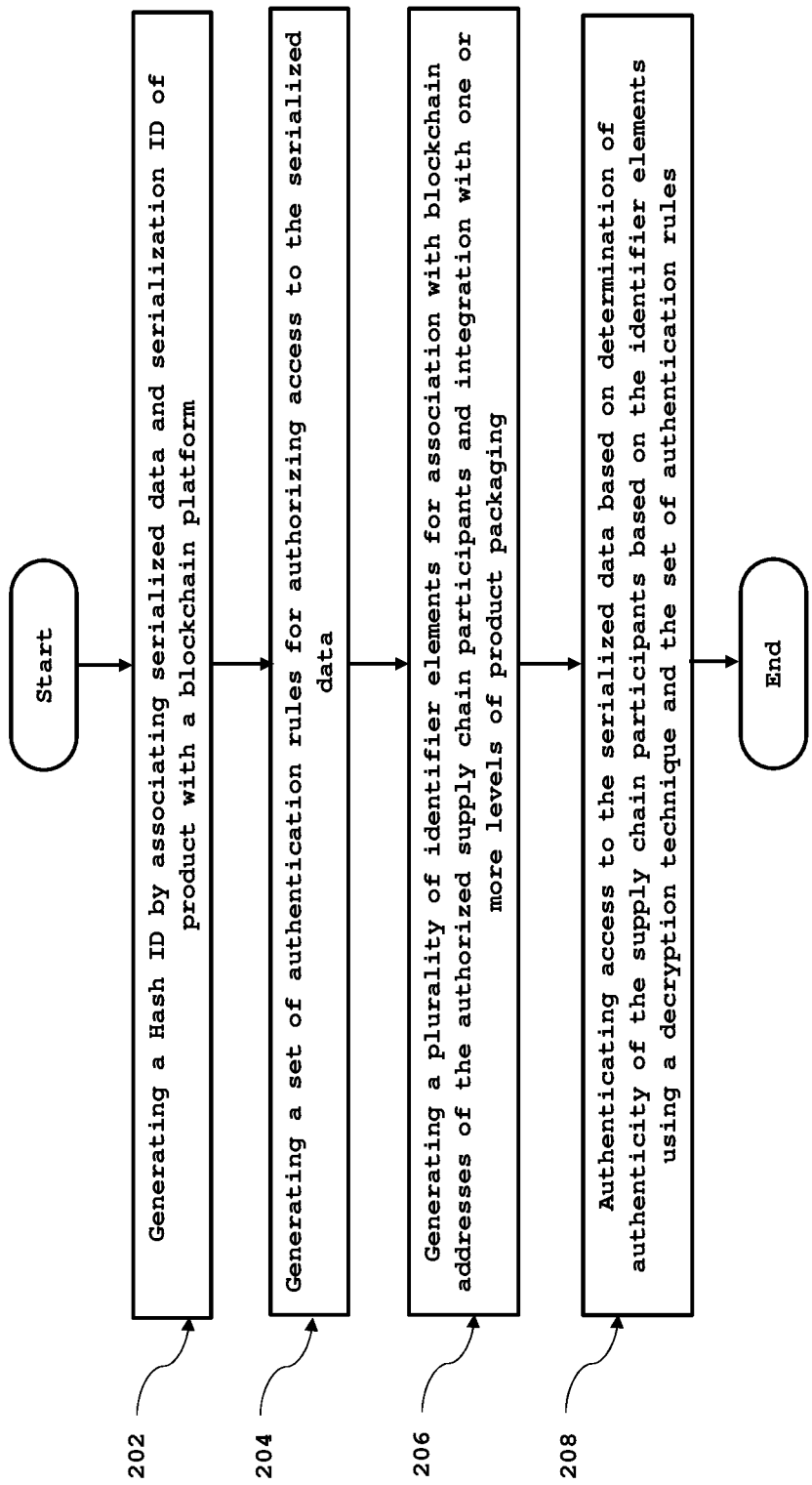

SYSTEM AND METHOD FOR SECURING AND AUTHENTICATING SERIALIZED DATA ASSOCIATED WITH A PRODUCT

CROSS REFERENCE TO RELATED APPLICATION

This application is related to and claims the benefit of Indian Patent Application Number 202041047911 filed on Nov. 3, 2020, the contents of which are herein incorporated by reference in their entirety.

FIELD OF THE INVENTION

The present invention generally relates to the field of data security and authorization. More particularly, the present invention relates to a system and a method for securing and authenticating serialized data associated with a product, thereby providing secure transitioning of the product across the supply chain.

BACKGROUND OF THE INVENTION

In today's era, most of the products and services are made available to a consumer through a supply chain. A supply chain associated with a product generally includes manufacturers, wholesalers, and retailers. Due to the presence of various participants in a supply chain, ensuring authenticity of products is essential. In order to ensure the authenticity of products across the supply chain, each of the product is appropriately packed and labelled with relevant information associated with the product. However, tampering of product information in the form of physical labels is easy. As a result, counterfeiting of products is on arise. Tampering of product information and counterfeiting of products not only affects the various manufacturers, but also the consumers and the economy. Moreover, counterfeiting of pharmaceutical and food supply may expose the consumers to health and safety dangers.

To overcome the aforementioned issues, one or more existing techniques associate physical elements such as RFID tags, barcode tags etc. with the products, whereby the serialized data associated with the products is accessed for product validation. However, the existing techniques offer limited capabilities to secure and track unauthorized access to the serialized data across supply chain. Therefore, with advancements in technology, hacking of the serialized data has increased, further enabling the counterfeiters to tamper serialized data and introduce fake products in the supply chain.

In light of the aforementioned drawbacks, there is a need for a system and a method which can efficiently secure and authenticate serialised data associated with a product. There is a need for a system and a method which can be easily integrated with any supply chain. There is a need for a system and a method which is capable of securing serialized data, and authenticating access and changes to the serialized data at various points across the supply chain. There is a need for a system and a method which is capable of maintaining a tamper resistant, traceable and transparent record of one or more changes to the serialised data. Further, there is a need for a system and a method where risk-based controls and processes are clearly enforced and recorded in an audit trail. Yet further, there is also a need for a system and a method which is cost effective and provides superior security to the serialized data associated with the product.

SUMMARY OF THE INVENTION

In various embodiments of the present invention, a method for providing data computation via a quantum computer to a client computing device is disclosed. The method is implemented by at least one processor executing program instructions stored in a memory. The method comprises generating a Hash ID by associating a serialized data and a serialization ID of a product with a blockchain platform. The method further comprises generating a set of authentication rules, the set of authentication rules comprising policies for validating access to the serialized data based on the Hash ID and respective blockchain addresses of a plurality of authorised supply chain participants. Further, the method comprises generating a plurality of identifier elements for integration with one or more levels of product packaging. Each of the plurality of identifier elements encodes respective first level decryption key generated from the serialization ID, respective second level decryption key generated from the Hash ID and respective blockchain addresses of the plurality of authorized supply chain participants. Finally, the method comprises authorizing access to the serialized data across the supply chain on determination of authenticity of supply chain participants based on the respective identifier elements from the plurality of identifier elements. The encoded first level decryption key, the second level decryption key and the blockchain addresses are validated using a decryption technique and the set of authentication rules.

In various embodiments of the present invention, a system for securing and authenticating serialized data associated with a product across a supply chain is disclosed. The system interfaces with a supply chain network and a blockchain platform. The system comprises a memory storing program instructions, a processor configured to execute program instructions stored in the memory, and an authentication engine executed by the processor. The system configured to generate a Hash ID by associating a serialized data and a serialization ID of a product with the blockchain platform. Further, the system configured to generate a set of authentication rules, the set of authentication rules comprising policies for validating access to the serialized data based on the Hash ID and respective blockchain addresses of a plurality of authorized supply chain participants. Further, the system is configured to generate a plurality of identifier elements for integration with one or more levels of product packaging, each of the plurality of identifier elements encoding respective first level decryption key generated from the serialization ID, respective second level decryption key generated from the Hash ID and respective blockchain addresses of the plurality of authorized supply chain participants. Finally, the system is configured to authorize access to the serialized data across the supply chain on determination of authenticity of the supply chain participants based on the respective identifier elements from the plurality of identifier elements, where the respective first level decryption key, the respective second level decryption key and the blockchain addresses are extracted and validated using a decryption technique and the set of authentication rules.

In various embodiments of the present invention, a computer program product is provided. The computer program product comprises a non-transitory computer-readable medium having computer-readable program code stored thereon, the computer-readable program code comprising instructions that when executed by a processor, cause the processor to generate a Hash ID by associating a serialized data and a serialization ID of a product with a blockchain platform. Further, a set of authentication rules is generated, the set of authentication rules comprising policies for validating access to the serialized data based on the Hash ID and respective blockchain addresses of a plurality of authorized supply chain participants, the set of authentication rules associated with an identifier validation address of the blockchain platform. Furthermore, a plurality of identifier elements are generated for integration with one or more levels of product packaging, each of the plurality of identifier elements encoding the identifier validation address, respective first level decryption key generated from the serialization ID, respective second level decryption key generated from the Hash ID and respective blockchain addresses of the plurality of authorized supply chain participants. Finally, access to the serialized data is authorized across the supply chain on determination of authenticity of the supply chain participants based on the respective identifier elements from the plurality of identifier elements, where the respective first level decryption key is validated based on the serialization ID, and the set of authentication rules are invoked using the identifier validation address for validating the second level decryption key and the blockchain address.

BRIEF DESCRIPTION OF THE ACCOMPANYING DRAWINGS

The present invention is described by way of embodiments illustrated in the accompanying drawings wherein:

FIG. 2 is a flowchart illustrating a method for securing and authenticating serialized data associated with a product across various points in a supply chain, in accordance with various embodiments of the present invention.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention discloses a system and a method for securing and authenticating serialized data associated with a product across various points in a supply chain. In particular, the present invention provides for generating a serialization ID and a serialised data from product data. The present invention further provides for generating a Hash ID by associating the serialised data and the serialization ID with a blockchain platform. Further, the present invention, provides for generating a set of authentication rules for association with the blockchain platform, where the set of authentication rules comprises policies for validating supply chain participants and updating serialised data. Furthermore, the present invention provides for generating a plurality of identifier elements for association with blockchain addresses of the supply chain participants and integration with one or more levels of product packaging. The identifier elements are unique to each authorised participant of the supply chain. Yet further, the present invention provides access to the serialized data across the supply chain on determination of the authenticity of the supply chain participants based on the identifier elements distributed with the product packaging to the various supply chain participants using a decryption technique and the set of authentication rules. A result representative of authentication success or failure is stored in the blockchain platform for tracking and authentication of the serialized data. Advantageously, the present invention facilitates traceability and auditability to detect any anomalous behaviour across the supply chain.

Figure 1:
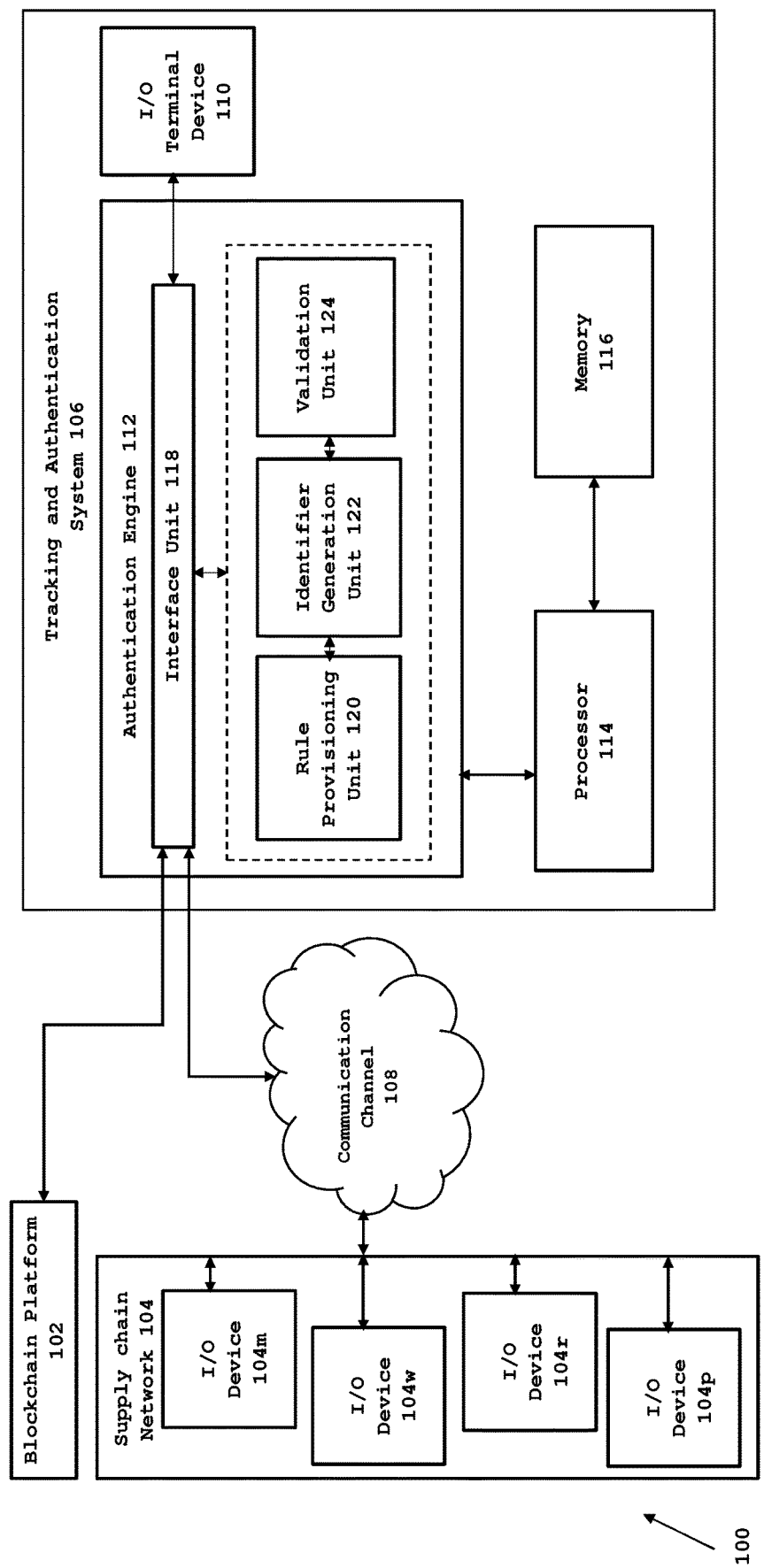
FIG. 1 illustrates a block diagram of a system for securing and authenticating serialized data associated with a product across various points in a supply chain, in accordance with an embodiment of the present invention.

The present invention would now be discussed in context of embodiments as illustrated in the accompanying drawings. FIG. 1 illustrates a block diagram of a system for securing and authenticating serialized data associated with a product across various points in a supply chain, in accordance with various embodiment of the present invention. Referring to FIG. 1, an environment 100 including the system for securing and authenticating serialized data associated with a product is shown. The environment 100 includes a blockchain platform 102, a supply chain network 104, and a system for securing and authenticating serialized data associated with a product hereinafter referred to as tracking and authentication system 106.

In various embodiments of the present invention, the blockchain platform 102 may be any platform capable of implementing blockchain technology and distributed ledger technology to create distributed and decentralized blockchain ledger. In an embodiment of the present invention as shown in FIG. 1, the blockchain platform 102 is configurable to create and update timestamped records of data in a sequential chain of blocks using blockchain technology. Further the chain of blocks or the ledger is distributed to various nodes of the blockchain network. In an exemplary embodiment of the present invention, the blockchain platform may be selected from a standard distributed open source ledger such as a Hyperledger Fabric and Ethereum. In various embodiments of the present invention the blockchain platform 102 is configured to interface with the tracking and authentication system 106.

In an embodiment of the present invention, the supply chain network 104 is a network comprising a plurality of input output (I/O) devices (104m, 104w, 104r, 104p) associated with authorised supply chain participants. In an exemplary embodiment of the present invention, the supply chain includes an authorized manufacturer, an authorized wholesaler, an authorized retailer and an authorized pharmacy. The supply chain network 104 includes a manufacturer I/O device 104m, a wholesaler I/O device 104w, a retailer I/O device 104r, and a pharmacy I/O device 104p. Examples of I/O devices (104m, 104w, 104r, 104p) may include, but are not limited to computers, smartphones, or any other device capable of executing instructions, scanning/decoding barcodes and transmitting/receiving data. In accordance with various embodiments of the present invention, the supply chain network 104, in particular the manufacturer I/O device 104m, the wholesaler I/O device 104w, the retailer I/O device 104r, and the pharmacy I/O device 104p are configured to interface with the tracking and authentication system 106.

In accordance with various embodiments of the present invention, the tracking and authentication system 106 may be a software or a combination of hardware and software. The tracking and authentication system 106 is configured to interface with the blockchain platform 102 and the supply chain network 104. In an embodiment of the present invention, the tracking and authentication system 106 is configured to interface with the blockchain platform 102 using a software interface to generate and obtain blockchain credentials, store data, hash data and validate changes to the data. In an embodiment of the present invention, the tracking and authentication system 106 is configured to interface with the supply chain network 104 over a communication channel 108 to transmit/receive encoded/decoded information. Examples of the communication channel 108 may include, but are not limited to, an interface such as a software interface, a physical transmission medium, such as, a wire, or a logical connection over a multiplexed medium, such as, a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In an embodiment of the present invention, the tracking and authentication system 106 may be implemented as a client-server architecture, wherein the supply chain network 104 accesses a server hosting the tracking and authentication system 106 over the communication channel (108).

In another embodiment of the present invention, the tracking and authentication system 106 may be implemented in a cloud computing architecture in which data, applications, services, and other resources are stored and delivered through shared datacenters. In an exemplary embodiment of the present invention, the functionalities of the tracking and authentication system 106 are delivered as software as a service (SAAS) to the supply chain network 104.

In an embodiment of the present invention as shown in FIG. 1, the tracking and authentication system 106 comprises an input/output (I/O) terminal device 110, an authentication engine 112, a processor 114 and a memory 116. The authentication engine 112 is operated via the processor 114 specifically programmed to execute instructions stored in the memory 116 for executing functionalities of the system 108 in accordance with various embodiments of the present invention. Examples of the input/output (I/O) terminal device 110 may include, but are not limited to, a touchscreen display, a combination of keyboard and a display or any other wired or wireless device capable of receiving inputs and displaying output results.

In accordance with various embodiments of the present invention, the authentication engine 112 is configured to serialize product data, generate authentication rules, hash serialized data, encode/decode data to create identifiers, authenticate decoded data based on the authentication rules, and allow access and state transition of serialized data across various points in a supply chain.

In accordance with various embodiments of the present invention, the authentication engine 112 has multiple units which work in conjunction with each other for tracking and authenticating serialized data associated with the product. The various units of the authentication engine 112 are operated via the processor 114 specifically programmed to execute instructions stored in the memory 116 for executing respective functionalities of the multiple units in accordance with various embodiments of the present invention. In an embodiment of the present invention, the memory 116 may be partitioned into a Random-Access Memory (RAM) and Read-only memory (ROM). In an embodiment of the present invention, the authentication engine 112 comprises an interface unit 118, a rule provisioning unit 120, an identifier generation unit 122, and a validation unit 124.

The interface unit 118 is configured to interact with the blockchain platform 102 and the supply chain network 104 including devices (104m, 104w, 104r and 104p), and the I/O terminal device 110. The interface unit 118 is configured to interface with the blockchain platform 102 using a software interface. In an exemplary embodiment of the present invention, the interface unit 118 is configured with one or more application programming interfaces (APIs) such as REST API to access various functions of the blockchain platform 102. In an embodiment of the present invention, the interface unit 118 interacts with the blockchain platform 102 for storing data, hashing data and consensus validation. In an embodiment of the present invention, the interface unit 118 is configured to interface with supply chain network 104 over a communication channel 108 to transmit/receive encoded/decoded information. In an exemplary embodiment of the present invention, the interface unit 118 provides a graphical user interface (not shown) to obtain and display data. The graphical user interface is accessible by the supply chain network 104 via a software module installable on the manufacturer I/O device 104m, the wholesaler I/O device 104w, the retailer I/O device 104r, and the pharmacy I/O device 104p. In another exemplary embodiment of the present invention, the graphical user interface of the interface unit 118 may be accessed through an IP address. In an embodiment of the present invention, the graphical user interface is also accessible by the terminal device 110. The interface unit 118 is configured to interact with the I/O terminal device 110 to receive one or more inputs or configurations, and transmit results.

In an embodiment of the present invention, the rule provisioning unit 120 is configured to generate a Hash ID by associating serialized data and serialization ID of product with the blockchain platform 102. In operation, the rule provisioning unit 120 is configured to retrieve product data via the interface unit 118 subsequent to acceptance of a product-request by the supply chain network 104, said product-request initiated by the authorised manufacture. Further, the rule provisioning unit 120 is configured to generate the serialized data and associated serialization ID from the product data using data serialization. In an exemplary embodiment of the present invention, the product data is obtained from the manufacturer I/O device 104m. In an embodiment of the present invention, the product data may include, but is not limited to, product name, product ID, origin address, names of the authorized supply chain participants, and product packaging information including, but not limited to, GTIN number, NDC number, labeler code, product number, package code, serial number, lot number and expiration date. In an exemplary embodiment of the present invention, the product data may be obtained from a pre-packaged product by scanning an associated physical element such as QR code via the manufacturer I/O device 104m. In an exemplary embodiment of the present invention, where the product is a drug, the serialization ID associated with the serialized data is generated based on a predefined National Drug Code (NDC) and a serial code. The NDC comprises a labeler code, a package code, a product code, and the serial code comprises 20 characters.

The rule provisioning unit 120 is further configured to generate blockchain addresses and unique passcodes for a supply chain authorizer and authorized supply chain participants via the blockchain platform 102. In an embodiment of the present invention, the blockchain addresses are representative of blockchain platform addresses for writing and verifying data in the blockchain platform 102. The supply chain authorizer address is representative of blockchain platform address for writing, storing and updating the serialised data and serialised ID associated with the product. In an embodiment of the present invention, the rule provisioning unit 120 is configured to generate the supply chain authorizer blockchain addresses and receive unique passcode. Further, the rule provisioning unit 120 enables the authorized supply chain participants to generate respective blockchain addresses and receive unique passcodes using the graphical user interface on their respective I/O devices (104m, 104w, 104r, and 104p).

Further, the rule provisioning unit 120 is configured to generate the Hash ID by writing the serialised data and the serialization ID in the blockchain platform 102 via the interface unit 118. In particular, the rule provisioning unit 120 is configured to write the serialised data and the serialization ID in the supply chain authorizer address of the blockchain platform 102. In operation the serialised data and the serialization ID are associated with the blockchain platform 102 by writing said data and ID in a block provided by the blockchain platform 102. Further, the written serialised data and serialization ID are encrypted, wherein the written serialised data and serialization ID are digitally signed with the unique passcode of the supply chain authorizer, hashed and validated via blockchain consensus.

In various embodiments of the present invention, the rule provisioning unit 120 is configured to generate a set of authentication rules. In operation, the rule provisioning unit 120 generates the set of authentication rules for association with the blockchain platform 102. In an embodiment of the present invention, the set of authentication rules are generated for authorising access to the serialised data in the blockchain platform based on a predefined criteria agreed by the authorised participants of the supply chain network 104. In various embodiments of the present invention, the set of authentication rules comprises authorisation information, including, but not limited to, blockchain addresses of the authorized supply chain participants, supply chain authorizer address and the generated Hash ID. Further, the set of authentication rules comprises policies for validating the authenticity of supply chain participants and updating the serialised data based on the authorisation information. In an exemplary embodiment of the present invention, the set of authentication rules are configured to map the Hash ID, authenticate supply chain participants and call the supply chain authorizer address to allow access to the serialised data associated with the product. In an exemplary embodiment of the present invention, the set of authentication rules are implemented as a smart contract in the blockchain platform 102 and integrated with a blockchain address generated for the authentication rules, hereinafter referred to as identifier validation address. In an embodiment of the present invention, the set of authentication rules may be deployed as chain code within the blockchain platform.

In various embodiments of the present invention, the identifier generation unit 122 is configured to receive the serialization ID, the Hash ID, blockchain addresses of the authorized supply chain participants and the identifier validation address from the rule provisioning unit 120. The identifier generation unit 122 is configured to generate a plurality of identifier elements for association with the blockchain addresses of the authorized supply chain participants, and integration with one or more levels of product packaging. In an embodiment of the present invention, the plurality of identifier elements are generated using the serialization ID, the Hash ID, blockchain addresses of the authorized supply chain participants and the identifier validation address. The plurality of identifier elements are unique to each authorised participant of the supply chain, and the information encoded in each of the identifier element is configured to enable access to the serialised data. In an embodiment of the present invention, each identifier element encodes the identifier validation address, a first level decryption key unique to each authorised participant, a second level decryption key unique to each authorised participant and blockchain address unique to each authorised participant. In an embodiment of the present invention, generating the plurality of identifier elements comprises, generating a plurality of first level decryption keys by dividing the generated serialization ID into (n) parts such that the combination of n parts forms a complete serialization ID. Further, a plurality of second level decryption keys are generated by segregating the Hash ID into (n) parts such that the combination of (n) parts forms a complete Hash ID. In an exemplary embodiment of the present invention, (n) is the number of supply chain participants including the manufacturer, the wholesaler, the retailer, and the pharmacy. Finally, the identifier validation address, the plurality of first level decryption keys, and the plurality of second level decryption keys are encoded into (n) 256 bit IDs and combined with respective blockchain addresses of the authorised participant to generate (n) unique identifier elements. In an embodiment of the present invention, the unique identifier elements are in form of Rest APIs. In various embodiments of the present invention, the generated identifier elements may be encoded as barcodes, data matrix, QR codes, Aztec, maxiCode, Ms Tag, Beetagg, SnapTag, shotcode or any physical element capable of holding encoded information. In an exemplary embodiment of the present invention the plurality of unique identifiers are QR codes, where each QR opens a link to access serialised data associated with the product on successful validation after scanning. Further, the identifier generation unit 122 is configured to maintain a record of each identifier element and the corresponding blockchain addresses of the authorized supply chain participants in the memory 116.

Figure 1A:
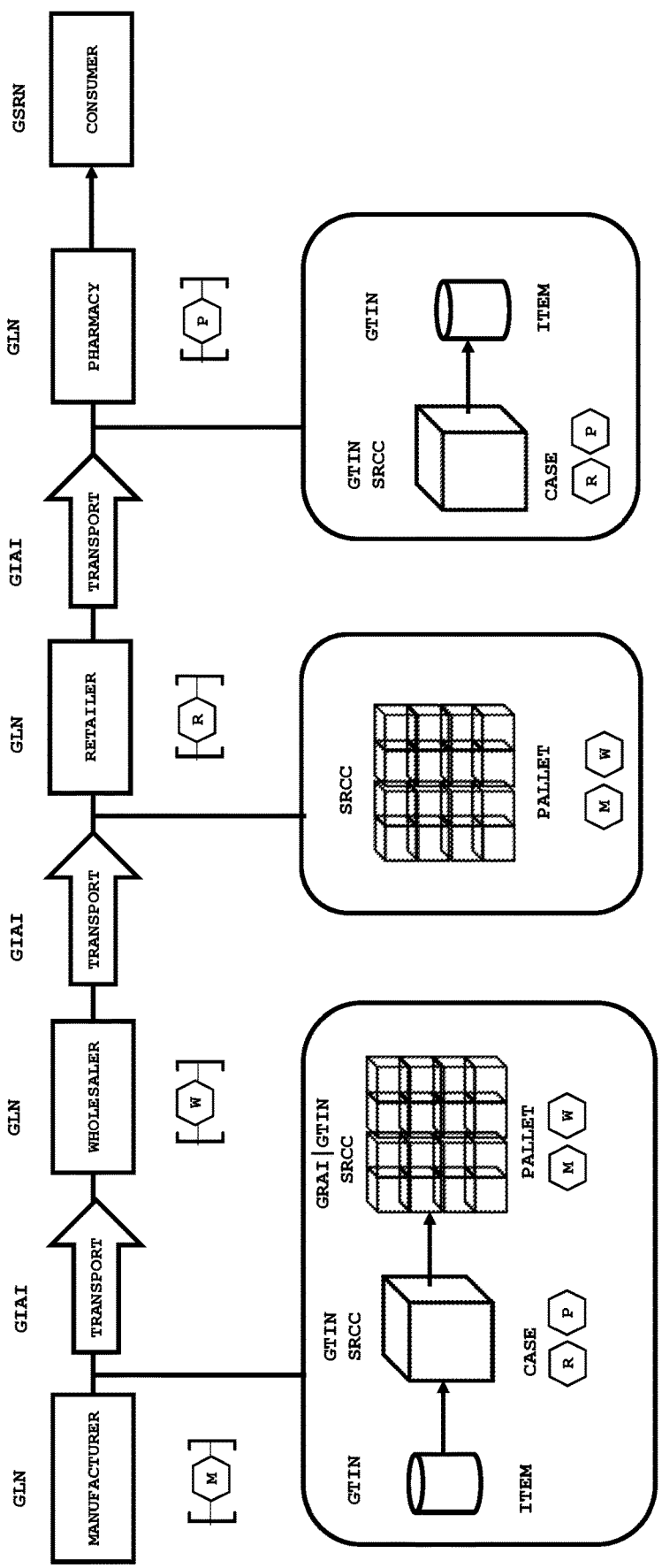
FIG. 1A illustrates distribution of product packaging integrated with unique identifiers across various supply chain participants, in accordance with an embodiment of the present invention.

In an exemplary embodiment of the present invention as shown in FIG. 1A, the plurality of identifier elements are distributed with the product packaging to the various supply chain participants. As shown in FIG. 1A, the product is a drug, and the unique identifiers are associated with various levels of product packaging. The pallet level product packaging is integrated with unique identifiers for the manufacturer and the wholesaler. Similarly, the case level product packaging is associated with the unique identifiers for the retailers and the pharmacy. In an embodiment of the present invention, each of the plurality of unique identifiers may be integrated with the consumer product case.

In various embodiments of the present invention, the validation unit 124 is configured to receive the serialization ID, the information encoded in each of the plurality of unique identifiers and associated blockchain addresses from the identifier generation unit 122. The validation unit 124 is configured to allow access to the serialized data across various supply chain participants on determination of authenticity of the supply chain participants based on the identifier elements using a decryption technique and the set of authentication rules. In various embodiments of the present invention, the authorized supply chain participants are identified based on the identifier elements and the blockchain addresses used for transmitting information encoded in said identifier elements using the decryption technique. In operation, the validation unit 124 is configured to receive the information encoded in respective unique identifiers from the blockchain addresses of the supply chain participants via the I/O devices (104m, 104w, 104r and 104p) on validation of respective unique passcodes. The validation unit 124 performs a check to determine the authenticity of association between the blockchain address transmitting the information encoded in the identifier elements and the blockchain addresses of the authorized supply chain participant associated with the respective identifier elements. The validation unit 124 maps the blockchain address associated with respective identifier elements with the blockchain addresses of the authorized supply chain participants stored in the memory 116. The validation unit 124 generates a fault notification and transmits the same to the I/O device 104m of the manufacturer if a mismatch is determined. In an exemplary embodiment of the present invention, where the identifier element is a QR code, a fault notification is generated if the QR code for the retailer I/O device is scanned and transmitted via the pharmacy I/O device using the pharmacy blockchain address and vice versa.

In various embodiments of the present invention, the validation unit 124 initiates a first level authorization if a match is found between the blockchain address of respective identifier elements and the blockchain address of the authorized supply chain participant. The first level authorization is performed based on the information extracted from each of the unique identifiers. In an embodiment of the present invention, the first level authorization comprises mapping the first level decryption key extracted from the identifier element with the characters of serialization ID.

Further, the validation unit 124 is configured to initiate a second level authorization on successful mapping of the first level decryption key with the characters of serialization ID. In various embodiments of the present invention, the second level authorization is provided by invoking the set of authentication rules. In an embodiment of the present invention, the identifier validation address is extracted from the unique identifier. The set of authentication rules are invoked using the extracted address. The invoked set of authorization rules enforces the defined policies and maps the second level decryption key with the Hash ID, and subsequently verifies the address of the authorized supply chain participants. Further, the set of authentication rules calls the supply chain authorizer address to allow access for updating the serialized data and include supply chain state transition using respective unique passcodes of the authorized supply chain participants. The validation unit 124 is configured to write the result representative of authentication success or failure in the blockchain platform 102, and transmit the same to the supply chain network 104.

Advantageously, the system in accordance with various embodiments of the present invention secures the serialised data associated with the product using encryption enabled by the identifier elements and the blockchain platform. Further, the system of the present invention facilitates traceability and auditability to detect any anomalous behaviour across the supply chain.

FIG. 2 is a flowchart illustrating a method for securing and authenticating serialized data associated with a product across various points in a supply chain, in accordance with various embodiments of the present invention.

At step 202, a Hash ID is generated by associating serialized data and serialization ID of a product with a blockchain platform. In an embodiment of the present invention, the Hash ID is generated by associating serialized data and serialization ID of the product with a blockchain platform subsequent to acceptance of a product-request by a supply chain network. In an exemplary embodiment of the present invention, the supply chain network includes an authorized manufacturer, an authorized wholesaler, an authorized retailer and an authorized pharmacy. In an embodiment of the present invention, the product-request is representative of any request associated with supply of product. In an embodiment of the present invention, the serialized data and associated serialization ID are generated from the product data using data serialization. In operation, the product request is initiated by the manufacturer via a manufacturer I/O device 104m. Further, the product data is obtained from the manufacturer I/O device 104m subsequent to acceptance of the product-request by the supply chain network. It is to be understood that for a different product there may be different supply chain participants in the supply chain network. In an embodiment of the present invention, the product data may include, but is not limited to, product name, product ID, origin address, names of the authorized supply chain participants, and product packaging information including, but not limited to, GTIN number, NDC number, labeler code, product number, package code, serial number, lot number and expiration date. In an exemplary embodiment of the present invention, the product data may be extracted from a pre-packaged product by scanning an associated physical element such as QR code via the manufacturer I/O device 104m of FIG. 1. In an exemplary embodiment of the present invention, where the product is a drug, the serialization ID associated with the serialized data is generated based on a predefined National Drug Code (NDC) and a serial code. The NDC comprises a labeler code, a package code, a product code, and the serial code comprises 20 characters.

Further, blockchain addresses and unique passcodes for a supply chain authorizer and input output (I/O) devices (104m, 104w, 104r, 104p of FIG. 1) associated with authorised supply chain participants of the supply chain network are generated. In an embodiment of the present invention, the blockchain addresses are representative of blockchain platform addresses for accessing the blockchain platform. In an embodiment of the present invention, the blockchain addresses and unique passcodes for the supply chain authorizer and the authorized supply chain participants are generated using blockchain platform 102 of FIG. 1. In an embodiment of the present invention, respective blockchain addresses and unique passcodes for the supply chain authorizer and the input output (I/O) devices (104m, 104w, 104r, 104p of FIG. 1) associated with authorised supply chain participants are generated using the graphical user interface by the authorized supply chain participants on their respective I/O devices (110, 104m, 104w, 104r, and 104p).

Finally, a Hash ID is generated by writing the serialised data and the serialization ID in the supply chain authorizer address of the blockchain platform. In operation, the serialised data and the serialization ID are associated with the blockchain platform by writing said data and ID in a block provided by the blockchain platform. Further, the written serialised data and serialization ID are encrypted, wherein the written serialised data and serialization ID are digitally signed with the unique passcode associated with supply chain authorizer address, hashed and validated via blockchain consensus.

At step 204, a set of authentication rules are generated and associated with the blockchain platform. In an embodiment of the present invention, the set of authentication rules are generated for authorising access to the serialised data in the blockchain platform based on a predefined criteria agreed by the authorised participants of the supply chain network. In various embodiments of the present invention, the set of authentication rules comprises authorisation information, including, but not limited to, blockchain addresses of the authorized supply chain participants, the generated Hash ID, the supply chain authorizer address and unique passcode associated with the supply chain authorizer address. Further, the set of authentication rules comprises policies for validating the authenticity of supply chain participants and updating the serialised data based on the authorisation information. In an exemplary embodiment of the present invention, the set of authentication rules are configured to map the Hash ID, authenticate supply chain participants and call the supply chain authorizer address to allow access to the serialised data associated with the product. In an exemplary embodiment of the present invention, the set of authentication rules are implemented as a smart contract in the blockchain platform 102 and integrated with a blockchain address for the authentication rules, hereinafter referred to as identifier validation address. In an embodiment of the present invention, the set of authentication rules may be deployed as chain code within the blockchain platform.

At step 206, a plurality of identifier elements for association with blockchain addresses of the authorized supply chain participants and integration with one or more levels of product packaging are generated. In an embodiment of the present invention, the plurality of identifier elements are generated based on the serialization ID, the Hash ID, and the blockchain addresses of the authorized supply chain participants. The plurality of identifier elements are unique to each authorised participant of the supply chain, and the information encoded in each of the identifier element is configured to enable access to the serialised data. In an embodiment of the present invention, each identifier element encodes the identifier validation address, a first level decryption key unique to each authorised participant, a second level decryption key unique to each authorised participant and blockchain address unique to each authorised participant. In an embodiment of the present invention, generating the plurality of identifier elements comprises, generating a plurality of first level decryption keys by dividing the generated serialisation ID into (n) parts such that the combination of (n) parts forms a complete serialization ID. Further, a plurality of second level decryption keys are generated by segregating the Hash ID into (n) parts such that the combination of (n) parts forms a complete Hash ID. In an exemplary embodiment of the present invention, (n) is the number of supply chain participants including the manufacturer, the wholesaler, the retailer, and the pharmacy. Finally, the identifier validation address, the plurality of first level decryption keys, and the plurality of second level decryption keys are encoded into (n) 256 bit IDs and combined with respective blockchain addresses of the authorised participant to generate (n) unique identifier elements. In various embodiments of the present invention, the generated identifier elements may be in the form of barcodes, data matrix, QR codes, Aztec, maxiCode, Ms Tag, Beetagg, SnapTag, shotcode or any physical element capable of holding encoded information. In an exemplary embodiment of the present invention the plurality of unique identifiers are QR codes, where each QR opens a link to access serialised data associated with the product on successful validation. In an exemplary embodiment of the present invention, the plurality of identifier elements are distributed with the product packaging to the various supply chain participants. As shown in FIG. 1A, the product is a drug, and the unique identifier elements are associated with various levels of product packaging. The pallet level product packaging is integrated with unique identifiers for the manufacturer and the wholesaler. Similarly, the case level product packaging is associated with the unique identifiers for the retailers and the pharmacy. In an embodiment of the present invention, each of the plurality of unique identifier elements may be integrated with the consumer product case.

At step 208, access to the serialized data across various supply chain participants is allowed on determination of authenticity of the supply chain participants based on the identifier elements using a decryption technique and the set of authentication rules. In various embodiments of the present invention, authenticity of the supply chain participants is determined based on the identifier elements using a decryption technique. In operation, the information encoded in respective unique identifiers is received from the blockchain addresses of the supply chain participants on validation of respective unique passcodes. Further, a check is performed to determine the authenticity of association between the blockchain addresses transmitting the information encoded in the identifier element and the blockchain address of authorized supply chain participant associated with the identifier element. The blockchain address associated with respective identifier elements are mapped with the blockchain addresses of the authorized supply chain participants. A fault notification is generated and transmitted to the I/O device 104m of the manufacturer if a mismatch is determined. In an exemplary embodiment of the present invention, where the identifier element is a QR code, a fault notification is generated if the QR code for the retailer I/O device is scanned and transmitted via the pharmacy I/O device using the pharmacy blockchain address and vice versa.

In various embodiments of the present invention, a first level authorization is initiated if a match is found between the blockchain address of respective identifier elements and the blockchain address of the authorized supply chain participant. The first level authorization is performed based on the information extracted from each of the unique identifiers. In an embodiment of the present invention, the first level authorization comprises mapping the first level decryption key extracted from the identifier element with the characters of serialization ID.

Further, a second level authorization is initiated on successful mapping of the first level decryption key with the characters of serialization ID. In various embodiments of the present invention, the second level authorization is provided by invoking the set of authentication rules. In an embodiment of the present invention, the set of authentication rules are invoked by accessing the identifier validation address. The set of authentication rules are invoked using the extracted address. The invoked set of authorization rules enforces the defined policies and maps the second level decryption key with the Hash ID, and subsequently verifies the address of the authorized supply chain participants.

In various embodiments of the present invention, the set of authentication rules calls the supply chain authorizer address to allow access for updating the serialized data and include supply chain state transition using respective unique passcodes of the authorized supply chain participants. A result representative of authentication success or failure is written in the blockchain platform and transmitted to the manufacturer I/O device 104*m*.

Advantageously, the method in accordance with various embodiments of the present invention secures the serialized data associated with the product using double encryption enabled by the identifier elements and the blockchain platform. Further, the method of the present invention facilitates traceability and auditability to detect any anomalous behavior across the supply chain.

Figure 3:
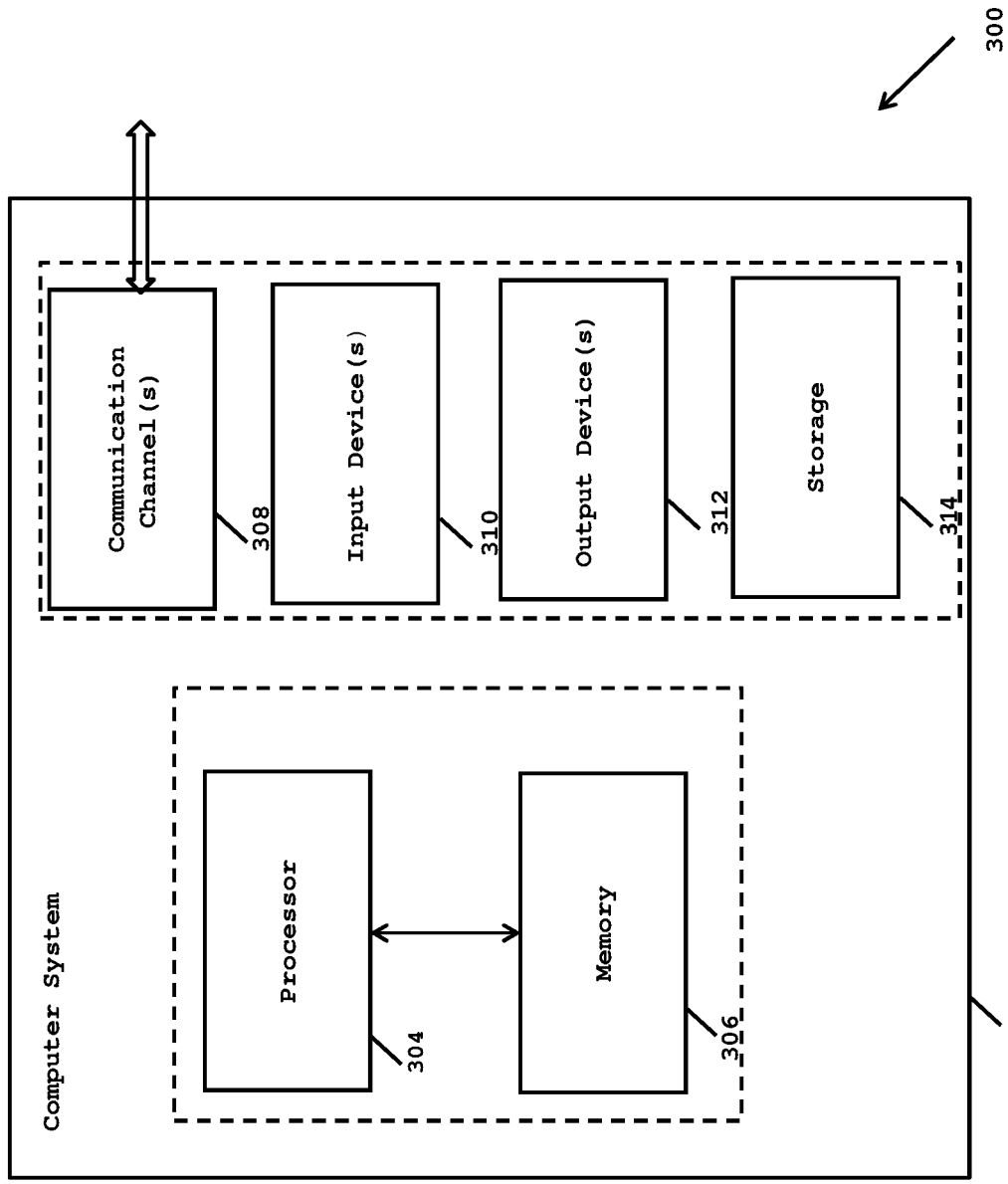
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including, but not limited to, a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for securing and authenticating serialized data associated with a product across a supply chain, wherein the method is implemented by at least one processor executing program instructions stored in a memory, the method comprising:
generating, by the processor, a Hash ID by associating a serialized data and a serialization ID of the product with a blockchain platform;
generating, by the processor, a set of authentication rules, the set of authentication rules comprising policies for validating access to the serialized data based on the Hash ID and respective blockchain addresses of a plurality of authorized supply chain participants;
generating, by the processor, a plurality of identifier elements for integration with one or more levels of the product packaging, each of the plurality of identifier elements encoding respective first level decryption keys generated from the serialization ID, respective second level decryption keys generated from the Hash ID and respective blockchain addresses of the plurality of authorized supply chain participants,
wherein the first level decryption keys are generated by dividing the serialization ID into (n) parts such that a combination of (n) parts forms a complete serialization ID, wherein (n) is the number of the plurality of authorized supply chain participants;
wherein the second level decryption keys are generated by segregating the Hash ID into (n) parts such that a combination of (n) parts forms a complete Hash ID, wherein (n) is the number of the plurality of authorized supply chain participants; and authorizing, by the processor, access to the serialized data across the supply chain on determination of authenticity of supply chain participants based on the respective identifier elements from the plurality of identifier elements, wherein the encoded first level decryption keys, the second level decryption keys and the blockchain addresses are validated using a decryption technique and the set of authentication rules, wherein validating the first level decryption keys comprises mapping the first level decryption keys extracted from respective identifier elements with the serialization ID;

wherein the set of authentication rules are invoked upon the validation of the respective first level decryption keys, wherein the set of authentication rules maps the second level decryption keys with the Hash ID and verifies the address of the authorized supply chain participants, and further wherein access to the serialized data is authenticated by calling a blockchain platform address of the serialized data using a unique passcode and updating supply chain state transition.

2. The method as claimed in claim 1, wherein the serialized data and the serialization ID are generated from data associated with the product using serialization, wherein data associated with the product includes product name, product ID, origin address, names of the authorized supply chain participants, and product packaging information further including GTIN number, NDC number, labeler code, product number, package code, serial number, lot number and expiration date.

3. The method as claimed in claim 1, wherein generating the Hash ID comprises writing the serialized data and the serialization ID in a supply chain authorizer address of the blockchain platform, wherein the supply chain authorizer address is representative of a blockchain address for storing the serialized data, further wherein the serialized data and serialization ID are digitally validated with a unique passcode associated with the supply chain authorizer address, hashed and validated via blockchain consensus.

4. The method as claimed in claim 1, wherein the set of authentication rules comprises authorization information including the blockchain addresses of the authorized supply chain participants, the Hash ID and a unique passcode and a blockchain platform address of the serialized data and the serialization ID.

5. The method as claimed in claim 3, wherein the set of authentication rules are configured to map the second level decryption keys with the Hash ID, authenticate supply chain participants and call the supply chain authorizer address to allow access to the serialized data of the product.

6. The method as claimed in claim 1, wherein the set of authentication rules are implemented as a smart contract in the blockchain platform by associating the set of authentication rules with an identifier validation address of the blockchain platform, wherein the identifier validation address is a blockchain address for storing the set of authentication rules.

7. The method as claimed in claim 1, wherein the plurality of identifier elements is distributed with the product packaging across the supply chain.

8. The method as claimed in claim 1, wherein the determination of authenticity of the supply chain participants based on the respective identifier elements using the decryption technique comprises:

validating unique passcodes associated with each of a plurality of blockchain addresses transmitting information encoded in the respective identifier elements; and performing a check to determine the authenticity of association between the blockchain addresses transmitting the information encoded in the respective identifier elements and the blockchain addresses of the authorized supply chain participants associated with the respective identifier elements on successful validation of the unique passcodes.

9. The method as claimed in claim 8, wherein a fault notification is generated if a mismatch is found between the blockchain address transmitting the information encoded in the identifier element and the blockchain address of the authorized supply chain participant associated with the identifier element.

10. The method as claimed in claim 1, wherein a result representative of authentication success or failure is stored in the blockchain platform and transmitted to the authorized supply chain participants.

11. A system for securing and authenticating serialized data associated with a product across a supply chain, wherein the system interfaces with a supply chain network and a blockchain platform, the system comprising:

a memory storing program instructions; a processor configured to execute the program instructions stored in the memory; and an authentication engine executed by the processor and configured to:

generate a Hash ID by associating a serialized data and a serialization ID of the product with the blockchain platform;

generate a set of authentication rules, the set of authentication rules comprising policies for validating access to the serialized data based on the Hash ID and respective blockchain addresses of a plurality of authorized supply chain participants;

generate a plurality of identifier elements for integration with one or more levels of the product packaging, each of the plurality of identifier elements encoding respective first level decryption keys generated from the serialization ID, respective second level decryption keys generated from the Hash ID and respective blockchain addresses of the plurality of authorized supply chain participants;

wherein the first level decryption keys are generated by dividing the serialization ID into (n) parts such that a combination of (n) parts forms a complete serialization ID, wherein (n) is the number of the plurality of supply chain participants;

wherein the second level decryption keys are generated by segregating the Hash ID into (n) parts such that a combination of (n) parts forms a complete Hash ID, wherein (n) is the number of the plurality of supply chain participants;

authorize access to the serialized data across the supply chain on determination of authenticity of the supply chain participants based on the respective identifier elements from the plurality of identifier elements, wherein the respective first level decryption key, the respective second level decryption key and the blockchain addresses are extracted and validated using a decryption technique and the set of authentication rules;

validating the first level decryption keys comprises mapping the first level decryption keys extracted from respective identifier elements with the serialization ID; and wherein the set of authentication rules are invoked upon validation of the respective first level decryption keys, wherein the set of authentication rules maps the second level decryption keys with the Hash ID and verifies the address of the authorized supply chain participants, and further wherein access to the serialized data is authenticated by calling a blockchain platform address of the serialized data using a unique passcode, and updating supply chain state transition.

12. The system as claimed in claim 11, wherein the supply chain includes an authorized manufacturer, an authorized wholesaler, an authorized retailer and an authorized pharmacy.

13. The system as claimed in claim 11, wherein the processor is configured to generate the Hash ID by:
generating the serialized data and the serialization ID from data associated with the product data using serialization subsequent to acceptance of a product-request by the supply chain network;
generating a supply chain authorizer address and associated unique passcode using the blockchain platform, wherein the supply chain authorizer address is representative of a blockchain address for storing serialized data; and
writing the serialized data and the serialization ID in the supply chain authorizer address, further wherein the serialized data and serialization ID are digitally validated with the associated unique passcode associated with the supply chain authorizer address, hashed and validated via blockchain consensus.

14. The system as claimed in claim 11, wherein the processor is configured to generate the set of authentication rules, wherein the set of authentication rules comprises authorization information including the blockchain addresses of the authorized supply chain participants, the Hash ID and a unique passcode and a supply chain authorizer address storing the serialized data and the serialization ID.

15. The system as claimed in claim 11, wherein the set of authentication rules are configured to map the second level decryption keys with the Hash ID, authenticate supply chain participants and call a supply chain authorizer address to allow access to the serialized data of the product, wherein the supply chain authorizer address is representative of a blockchain address for storing the serialized data.

16. The system as claimed in claim 11, wherein the set of authentication rules are implemented as a smart contract in the blockchain platform by associating the set of authentication rules with an identifier validation address of the blockchain platform, wherein the identifier validation address is a blockchain address for storing the set of authentication rules.

17. The system as claimed in claim 11, wherein the plurality of identifier elements is distributed with the product packaging across the supply chain.

18. The system as claimed in claim 11, wherein the processor is configured to determine authenticity of the supply chain participants based on the respective identifier elements using the decryption technique by:
validating unique passcodes associated with each of a plurality of blockchain addresses transmitting an information encoded in the respective identifier elements; and
performing a check to determine the authenticity of association between the blockchain addresses transmitting the information encoded in the respective identifier elements and the blockchain addresses of the authorized supply chain participants associated with the respective identifier elements on successful validation of the unique passcodes.

19. The system as claimed in claim 18, wherein a fault notification is generated if a mismatch is found between the blockchain address transmitting the information encoded in the identifier element and the blockchain address of the authorized supply chain participant associated with the identifier element.

20. The system as claimed in claim 11, wherein a result representative of authentication success or failure is stored in the blockchain platform and transmitted to the authorized supply chain participants.

21. A non-transitory computer-readable medium comprising:
a computer-readable program code stored thereon, the computer-readable program code comprising instructions that, when executed by a processor, cause the processor to:
generate a Hash ID by associating a serialized data and a serialization ID of a product with a blockchain platform;
generate a set of authentication rules, the set of authentication rules comprising policies for validating access to the serialized data based on the Hash ID and respective blockchain addresses of a plurality of authorized supply chain participants, the set of authentication rules associated with an identifier validation address of the blockchain platform;
generate a plurality of identifier elements for integration with one or more levels of the product packaging, each of the plurality of identifier elements encoding the identifier validation address, respective first level decryption keys generated from the serialization ID, respective second level decryption keys generated from the Hash ID and respective blockchain addresses of the plurality of authorized supply chain participants;
wherein the first level decryption keys are generated by dividing the serialization ID into (n) parts such that a combination of (n) parts forms a complete serialization ID, wherein (n) is the plurality of supply chain participants;
wherein the second level decryption keys are generated by segregating the Hash ID into (n) parts such that a combination of (n) parts forms a complete Hash ID, wherein (n) is the plurality of supply chain participants;
authorize access to the serialized data across the supply chain on determination of authenticity of the supply chain participants based on the respective identifier elements from the plurality of identifier elements, wherein the respective first level decryption key is validated based on the serialization ID, and the set of authentication rules are invoked using the identifier validation address for validating the second level decryption key and the blockchain address;
validating the first level decryption keys comprises mapping the first level decryption keys extracted from respective identifier elements with the serialization ID; and
wherein the set of authentication rules are invoked upon validation of the respective first level decryption keys, wherein the set of authentication rules maps the second level decryption keys with the Hash ID and verifies the address of the authorized supply chain participants, and further wherein access to the serialized data is authenticated by calling a blockchain platform address of the authenticated data using a unique passcode, and updating supply chain state transition.

* * * * *